United States Patent
Weitbruch et al.

(10) Patent No.: US 7,339,632 B2
(45) Date of Patent: Mar. 4, 2008

(54) METHOD AND APPARATUS FOR PROCESSING VIDEO PICTURES IMPROVING DYNAMIC FALSE CONTOUR EFFECT COMPENSATION

(75) Inventors: Sébastien Weitbruch, Mönchweiler (DE); Cédric Thebault, Villingen (DE); Carlos Correa, Villingen-Schwenningen (DE); Ingo Doser, Donaueschingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 532 days.

(21) Appl. No.: 10/518,583

(22) PCT Filed: Jun. 17, 2003

(86) PCT No.: PCT/EP03/50232

§ 371 (c)(1),
(2), (4) Date: Dec. 22, 2004

(87) PCT Pub. No.: WO2004/003881

PCT Pub. Date: Jan. 8, 2004

(65) Prior Publication Data

US 2005/0253972 A1    Nov. 17, 2005

(30) Foreign Application Priority Data

Jun. 28, 2002    (EP)    .................................. 02291612

(51) Int. Cl.
*H04N 9/12*    (2006.01)
*H04N 5/66*    (2006.01)
*H04N 5/21*    (2006.01)

(52) U.S. Cl. ...................................... 348/797; 348/607

(58) Field of Classification Search ................ 348/797, 348/771, 739, 616, 607, 617, 620, 621, 624, 348/699–701; 345/596, 37, 60, 63; 375/240.16, 375/240.01, 240.26; *H04N 5/66, 9/12, 5/21*
See application file for complete search history.

(56) References Cited

U.S. PATENT DOCUMENTS 6,476,875 B2 *    11/2002    Correa et al. ................ 348/607

(Continued)

FOREIGN PATENT DOCUMENTS

| EP | 0973147 | 1/2000 |
|---|---|---|
| EP | 1162571 | 12/2001 |
| WO | WO 01/24152 | 4/2001 |
| EP | 0978817 | 2/2000 |

OTHER PUBLICATIONS

T. Yamaguchi et al: "Degradation of Moving-Image Quality in PDPS: Dynamic False Contours", Journal of the Society For Information Display, Society for Information Display, San Jose, US, vol. 4, No. 4, Dec. 1996, pp. 263-270.
Search Report Dated Nov. 6, 2003.

*Primary Examiner*—Sherrie Hsia
(74) *Attorney, Agent, or Firm*—Joseph J. Laks; Harvey D. Fried

(57) ABSTRACT

The invention relates to a method for processing video pictures for display on a display device having a plurality of luminous elements corresponding to the pixels of a picture wherein the time of a video frame or field is divided into a plurality of N sub-fields during which the luminous elements can be activated for light emission in small pulses corresponding to a sub-field code word of n bits used for coding the p possible video levels lighting a pixel, comprising the steps of:
determining if pictures are static pictures or moving pictures,
in case of static pictures, processing video pictures using a first sub-field encoding method adapted to pictures when no motion is detected, and
in case of moving pictures, processing video pictures using a second encoding method reducing dynamic false contour effect adapted to pictures when motion is detected. The invention applies to plasma display panels.

23 Claims, 11 Drawing Sheets

U.S. PATENT DOCUMENTS 6,961,379 B2 * 11/2005 Weitbruch et al. ..... 375/240.16

7,023,450 B1 * 4/2006 Weitbruch et al. .......... 345/593

* cited by examiner

METHOD AND APPARATUS FOR PROCESSING VIDEO PICTURES IMPROVING DYNAMIC FALSE CONTOUR EFFECT COMPENSATION

This application claims the benefit, under 35 U.S.C. § 365 of International Application PCT/EP03/50232, filed Jun. 17, 2003, which was published in accordance with PCT Article 21(2) on Jan. 8, 2004 in English and which claims the benefit of European patent application No. 02291612.6, filed Jun. 28, 2002.

FIELD OF THE INVENTION

The present invention relates to a method for processing video pictures, especially a method improving dynamic false contour effect compensation in matrix display screens based on the principle of duty cycle modulation (PWM for Pulse Width Modulation) of light emission. The invention also relates to an apparatus for carrying out the method. The invention will be described in relation with plasma display panels (PDPs) but may be applicable to all kinds of displays based on the principle of duty cycle modulation such as DMD (Digital Micro-mirror Devices) or similar.

BACKGROUND OF THE INVENTION

Although plasma display panels are known for many years, plasma displays are encountering a growing interest from TV manufacturers. Indeed, this technology now makes it possible to achieve flat color panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology. On one hand, the plasma display technology gives the possibility of nearly unlimited screen size, also of attractive thickness, but on the other hand, it generates new kinds of artefacts which could reduce the picture quality. Most of these artefacts are different from the known artefacts occurring on classical CRT color picture tubes. This different appearance of the artefacts makes them more visible to the viewer since the viewer is used to see the well-known old TV artefacts.

The invention deals with a specific new artefact, which is called "dynamic false contour effect" since it corresponds to disturbances of gray levels and colors in the form of an apparition of colored edges in the picture when an observation point on the matrix screen moves. This kind of artefact is enhanced when the image has a smooth gradation like when the skin of a person is being displayed (e.g. displaying of a face or an arm, etc.). In addition, the same problem occurs on static images when observers are shaking their heads and that leads to the conclusion that such a failure depends on the human visual perception and happens on the retina of the eye.

Several approaches have been proposed to reduce or eliminate false contour effect. As, the false contour effect is directly related to sub-field organization of the used plasma technology, most of the approaches try to optimize the sub-fields organization of the plasma display panels. The sub-field organization will be explained in greater detail below, but for the moment, it should be noted that it is a kind of decomposition of the 8-bit gray level in 8 or more lighting sub-periods.

One approach proposed by Pioneer consists in using continuous sub-fields arrangements with no holes in the code. However, due to the reduction of the number of gray levels to the number of sub-fields, the picture quality is really damaged.

Another approach for compensating the dynamic false contour effect has been patented by Deutsche Thomson-Brandt GmbH in EP patent application No. 01 250 158.1. The patented method is based on gravity centered coding using only sub-field sequences having a similar progression of their lighting center of gravity as the progression of the video levels themselves. This is achieved through a reduction of the available video levels which will be recovered through dithering. Such a coding, while very good for moving sequences, is less efficient in case of still or non-moving pictures because of the dithering noise.

SUMMARY OF THE INVENTION

The object of the invention is to propose a new method optimising the choice of the coding depending on picture activity in terms of movement and noise.

The present invention relates to a method for processing video pictures for display on a display device having a plurality of luminous elements corresponding to the pixels of a picture wherein the time of a video frame or field is divided into a plurality of N sub-fields (SF) during which the luminous elements can be activated for light emission in small pulses corresponding to a sub-field code word of n bits used for coding the p possible video levels lighting a pixel, comprising the steps of:

determining if pictures are static pictures or moving pictures, in case of static pictures, processing video pictures using a first sub-field encoding method adapted to pictures when no motion is detected, and in case of moving pictures, processing video pictures using a second encoding method reducing dynamic false contour effect adapted to pictures when motion is detected.

According to a preferred embodiment, the first sub-field encoding method is a standard encoding method wherein the n bit video level is decomposed in n or more lighting sub-periods or sub-fields. The second sub-field encoding method is a method wherein among the set of p possible video levels for lighting a pixel, a sub-set of m video levels with n<m<p is selected, which is used for light generation, wherein the m values are selected according to the rule that the temporal centre of gravity for the light generation of the corresponding sub-field code words grow continuously with the video level apart in the low video level range up to a first predefined limit and/or in the high video level range from a second predefined limit on.

In this case, the temporal centre of gravity for the light generation is defined according to the following formula:

$$CG(\text{code}) = \frac{\sum_{i=1}^{n} sfW_i * \delta_i(\text{code}) * sfCG_i}{\sum_{i=1}^{n} sfW_i * \delta_i(\text{code})}$$

there $sfW_i$ is the sub-field weight of the $i^{th}$ sub-field, $\delta_i$ is equal to 1 if the $i^{th}$ sub-field is activated and zero if the $i^{th}$ sub-field is inactivated and $sfCG_i$ is the temporal centre of gravity for the light generation of the $i^{th}$ sub-field.

In addition, in case of a sub-field organization characterised by a specific number of sub-fields with a specific series of sub-field weights for a colour component value, more than one corresponding sub-field code word exists, the set of possible sub-field code words is reduced by taking only those sub-field code words for each video level, which have the minimum binary value for the case that in a sub-field code word the weight of each bit is ordered according to size.

Furthermore, the selection of video levels from the further reduced set of sub-field code words is performed by taking only one video level on each group of sub-field code words having the same radical on the MSB side, namely the video level belonging to the next higher group of sub-field code words and having the smallest centre of gravity superior to the centre of gravity of the previous selected video level, wherein in case that the next higher group of sub-field code words does not provide a sub-field code word having a centre of gravity inferior to the previous one, then the second next higher sub-field code word group will be chosen for selecting the next video level and so on.

According to another aspect of the present invention, the method comprises an additional step of:

determining if static and moving pictures are noisy pictures or free noise pictures and using an adaptive noise dithering for noisy pictures or a noise free dithering for noise free pictures. The adaptive noise dithering uses, for example, an error diffusion algorithm as described in "R. W. Floyd and I. Steinberg. Adaptive algorithm for spatial gray scale, SID Int. Symp. Dig. Tech. Papers pp 36-37, 1975". The noise free dithering may be, for example, a 3D dithering as described in EP patent application No. 00 250 099.9 in the name of Deutsche Thomson-Brandt GmbH or in EP patent application No. 01 250199.5 of the same applicant.

According to one embodiment of the present invention, when information about motion is already available through, from example the video IC, the decision to switch between the first sub-field encoding method and the second sub-field encoding method in view of the detection of the motion is done according to the following algorithm:

for each frame,
if MOTION is ON then MOTION-counter=2×MOTION-LIMIT,
if MOTION is OFF then MOTION counter=MOTION counter−1.

When MOTION-counter<MOTION-LIMIT then the first coding sub-field method is activated else the second coding sub-field method is maintained, the Motion-counter being a counter able to count from 0 to 2×MOTION-LIMIT, if MOTION-counter<0 then MOTION-counter=0.

In the same way, in case of noise, the decision to switch between an adaptive noise dithering and a noise free dithering is done according to the following algorithm:

For each frame,
If NOISE is ON then NOISE-counter=NOISE-counter+1.
If NOISE is OFF, then NOISE-counter=NOISE-counter−1.

When NOISE-counter>NOISE-LIMIT, an active adapted noise dithering is activated else a noise free dithering is used, the NOISE-counter being a counter able to count from 0 to 2×NOISE-limit, if NOISE-counter<0 then NOISE-counter=0 and if NOISE-counter>2×NOISE-LIMIT then NOISE-counter=2×NOISE-LIMIT.

According to another feature of the invention, when, for example, no motion information is available, the motion detection can be done by using the following method comprising the steps of:

splitting picture in M detection zones $Z(i,j)$;
computing for each detection zone $Z(i,j)$ an histogram of the zone content,
for each zone, comparing the computed histogram with the corresponding histogram of the previous picture,
if the difference is above a given limit, then putting Motion ON.

According to one embodiment, the histogram of the zone is defined by choosing a number of discrete regions, each one defined by lower and upper video frontiers.

So the following algorithm may be implemented to determine the motion in pictures.

```
DifferenceZone=0
For each zone Z(i;j,n)
{
    DifferenceRegion=0
    For each region R[k,n]
    {
        If (|R[k,n] − R[k,n−1]| > RegionLimit) then DifferenceRegion++
    }
    If (DifferenceRegion > ZoneLimit) then DifferenceZone++
}
If (DifferenceZone>FrameLimit) then Motion=ON else Motion=OFF
```

This algorithm has the advantage to be quite simple. No specific frame memory is required since only histograms are memorized which represent only few bits.

According to still another feature of the present invention, the noise detection can be done using the following method comparing two consecutive lines $A(i)$, $B(i)$. The method comprises the following steps of:

dividing the picture in segments L constituted by a set of N pixels taken from two consecutive lines,
calculating a noise estimation for the segment L:

$$\text{Noise}(L) = \frac{1}{N} \sum_{i=1}^{i=N} (A(i) - B(i))$$

defining the noise estimation for the whole picture as the minimum value of the noise estimation Noise=$\min_L$ (Noise (L)),
and comparing the value Noise to a threshold to determine if Noise is ON or OFF.

According to another embodiment, the noise detection can be done using the following method:

defining in blanking area of a picture, n' regions Reg(n') made of m pixels×l lines,
computing the mean values of each region with the following formula:

$$MGL(n') = \frac{1}{m \times l} \sum_{i,j} Pict(i, j)$$

i and j represent the various horizontal and vertical pixel positions of each region:

computing, for each region, the mean square error:

$$MSE(n') = \frac{1}{m \times l} \sum_{i,j} (Pict(i, j) - MGL(n'))^2,$$

estimating the final noise of the whole picture.

According to a specific embodiment of the present invention, the estimation of the final noise is done using a histogram representation of the various mean square errors MSE(n'). In this histogram representation, the minimum value is defined by the minimal error located in a digital picture given by $$MSE_{min} = \frac{1}{12}, \text{ since } MSE_{min} = \int_{-1/2}^{1/2} (x^2) dx = \left[\frac{x^3}{3}\right]_{-1/2}^{1/2} = \frac{1}{3} \cdot \left[\frac{1}{8} - \frac{1}{-8}\right]$$

where $x^2$ represents the square error integrated among the error dynamic, the error dynamic being $[-½;½]$ with a quantification step of 1.

On the horizontal axis of the histogram, various segment are chosen representing a domain of the value MSE×12.

In the vertical axis, the occurrence of each domain is computed as following:

```
For all region n
{
    For all domain k
    {
        if (Min(k) < MSE(n) ≦ Max(k)) then Histo[k]++
    }
}
```

Then, the highest value in the occurrence of the histogram is chosen to quantify the MSE of the whole picture.

Depending on a noise limit, if MSE>NOISE-limit then NOISE=ON else NOISE=OFF.

According to another embodiment of the present invention, the noise can be detected using the following steps:

dividing each picture in small blocks Block(n), for each block, performing an estimation of the mean square error:

$$MSE(n) = \frac{1}{N} \sum_{Block(n)} (Pict(i, j, t) - Pict(i, j, t-1))^2$$

Where t represents the current frame and t−1 the previous frame, i and j represent the horizontal and vertical positions of each pixels:

defining the noise level as the smallest MSE(n) for all blocks Block(n), comparing the various MSE(n) to a value MOTION BLOCK, if MSE(n)≧MOTION BLOCK, MOTION counter is increased, the MOTION-counter being initialised at the beginning of each frame and, when MOTION counter≧MOTION-limit then MOTION=ON else MOTION=OFF.

According to a further embodiment, used with frame memory, the method comprises the following steps:

dividing the current frame (t) in small blocks Block(n)

computing, for each corresponding block of a searching area in the previous frame (t−1) a mean square error:

$$MSE(\delta x, \delta y, n) = \frac{1}{N} \sum_{Block(n)} (Pict(i, j, t) - Pict(i - \delta x, j - \delta y, t-1))^2$$

Where N represents the size of the block n, computing, for each position in the searching area ($\delta x, \delta y$), the smallest MSE for a block n, choosing, $MSE_{min}(n) = \min_{\delta x, \delta y} (MSE(\delta x, \delta y))$ for noise estimation, choosing Motion(n)=1 if $MSE_{min}(n)$ is given for ($\delta x, \delta y$)=(0,0) else Motion(n)=0 computing, using the various $MSE_{min}(n)$ an histogram of errors for the noise estimation, computing a value $$\text{Motion-sum} = \sum_{all\ block\ n} Motion(n),$$

comparing this value to a limit and if Motion-sum≧Motion-limit then MOTION=ON else MOTION=OFF.

BRIEF DESCRIPTION OF THE DRAWINGS

Exemplary embodiments of the invention are illustrated in the drawings and are explained in more detail in the following description wherein.

DESCRIPTIONS OF PREFERRED EMBODIMENTS

The present invention relates to a method improving false contour effect compensation in matrix displays screens using a PWM modulation of light emission, for example in plasma display panels. According to the method of the present invention, a first sub-field encoding method, more particularly the standard encoding method is used when no motion is detected and a second sub-field encoding method is used when motion is detected.

Figure 1:
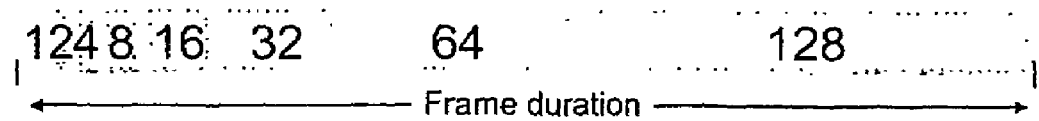
FIG. 1 shows a standard sub-field encoding principle.

As known, plasma display panel (PDP) utilises a matrix array of discharge cells. In this case, gray levels can not be expressed by analog control of the light emission. So, a PDP controls gray levels by a plulse width modulation (PWM) of each cells, i.e. by modulating the number of light pulses per frame period. This time modulation will be integrated by the eye over a period corresponding to the eye time response. The more often a cell is switched on in a given time frame, the higher is its luminance. According to the standard coding scheme, a minimum of 8 sub-fields (in case of a 8 bit video level data word) are used in a sub-field organization for a frame period. With a combination of these 8 sub-fields it is possible to generate the 256 different video levels. This addressing scheme is illustrated in FIG. 1. In this figure each video level for each colour component will be represented by a combination of 8 bits with the following weights:

1/2/4/8/16/32/64/128

To realize such a coding with the PDP technology, the frame period will be divided in 8 lighting periods called sub-fields, each one corresponding to a bit in a corresponding sub-field code word. The number of light pulses for the bit "2" is double as for the bit "1" and so forth. So, as mentioned above, with these 8 sub-periods it is possible, through sub-field combination, to build the 256 gray levels.

However, with this standard method, the light emission pattern according to the sub-field organization introduces new categories of image quality degradation corresponding to disturbances of gray levels and colours. These disturbances are defined as so called dynamic false contour effects, due to the fact that they correspond to the appearance of coloured edges in the picture when an observation point on the PDP screen moves. The observer has the impression of a strong contour appearing on a homogeneous area like displayed skin. The degradation is enhanced when the image has a smooth gradation and also when the light emission period exceeds several milliseconds. So, in dark scenes the effect is not so disturbing as in scenes with average gray level (e.g. luminance values from 32 to 223). In addition the same problem occurs in static images when observers shake their head, which leads to the conclusion that such a failure depends on the human visual perception. To better understand the basic mechanism of visual perception of moving images, a simple case will be considered. Let us assume a transition between the luminance levels 128 and 127 moving at a speed of 5 pixels per video frame and the eye is following this movement.

Figure 2:
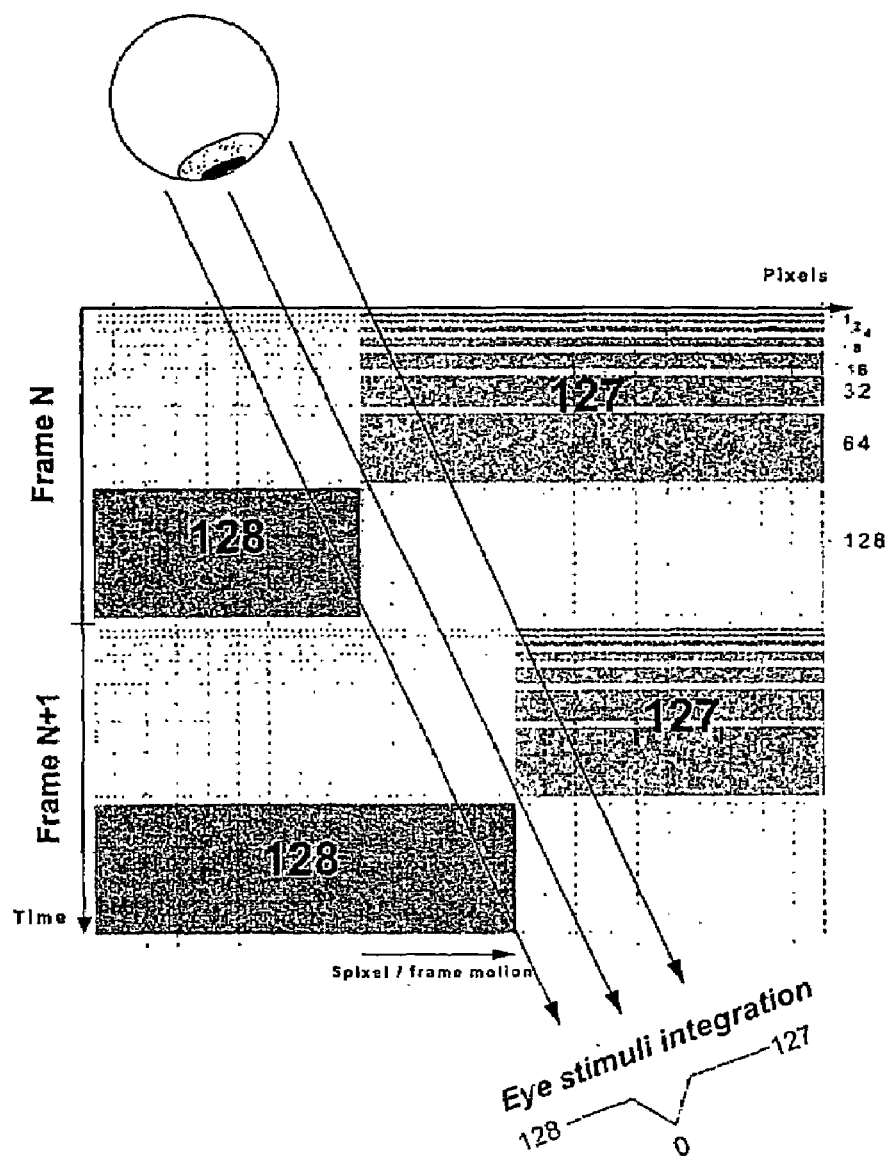
FIG. 2 shows an illustration for explaining the false contour effect.

FIG. 2 shows a darker shaded area corresponding to the luminance level 128 and a lighter shaded area corresponding to the luminance level 127. The sub-field organization shown in FIG. 1 is used for building the luminance levels 128 and 127 as it is depicted in the right side of FIG. 2. The three parallel lines in FIG. 2 indicate the direction in which the eye follows the movement. The two outer lines show the area borders where a faulty signal will be perceived. Between them the eye will perceive a lack of luminance, which leads to the appearance of a dark edge in the corresponding area, which is illustrated in FIG. 2 at the bottom. The effect that the lack of luminance will be perceived in the shown area is due to the fact that the eye will no longer integrate all lighting periods of one pixel when the point from which the eye receives light is in movement. Only part of the light pulses will probably be integrated when the point moves. Therefore, there is a lack of corresponding luminance and a dark edge will occur.

Figure 3:
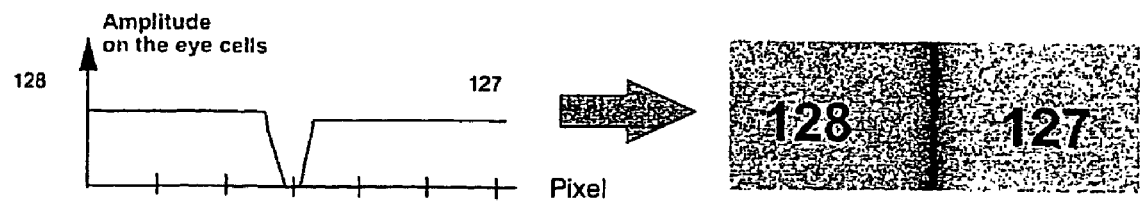
FIG. 3 illustrates the appearance of a dark edge when a display of two frames is made in the manner shown in FIG. 2.

On the left side of FIG. 3, a curve is shown, which illustrates the behaviour of the eye cells during observing a moving picture depicted in FIG. 2. The eye cells having a good distance from the horizontal transition will integrate enough light from the corresponding pixels. Only the eye cells, which are near the transition, will not be able to integrate a lot of light from the same pictures. In case of gray scale this effect corresponds to the apparition of artificial white or black edges. In the case of coloured pictures, since this effect will occur independently on the different colour components, it will lead to the apparition of coloured edges in homogeneous areas like skin. In a colour TV PDP, the same phenomenon will appear on the three components (RGB) but with different intensities depending on the colour level and its encoding in sub-fields. This will lead to coloured edges appearing on the picture and this is very annoying since they are unnatural. Furthermore, this effect will also occur in case of a sharp transition, e.g. a transition from white to black video level and combined with phosphor lag effect, this leads to a strong degradation of the sharpness of moving objects. The picture quality of moving images may be improved by using more than 8 sub-fields, for example a sub-field organization based on 10 sub-fields or 12 sub-fields which aim at reducing the weights of the MSBs, which are directly linked to the maximum level of false contour generated. So, according to the invention, standard coding scheme is used when no motion is detected and an other type of coding scheme taking in account the fact that the false contour effect occurs when there is a transition to one level to another, is used when motion is detected. Such coding scheme may be, for example, the coding scheme known as gravity centered coding (GCC).

This specific coding scheme will be explained hereafter with reference to FIGS. 4 to 7.

Figure 4:
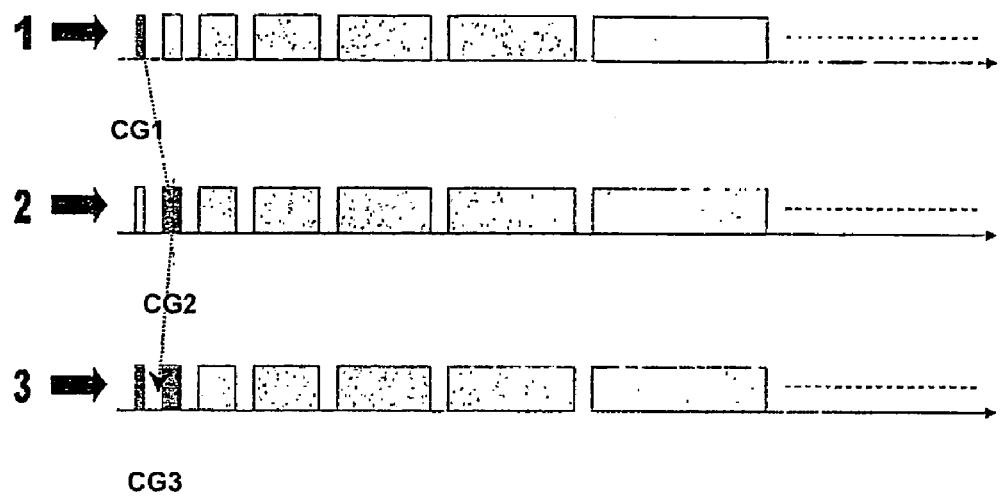
FIG. 4 illustrates that the temporal center of gravity of the light generation is not growing monotonously with the video levels.

As described above a PDP emits light pulses in pulse width modulation form and the human eye integrates these light pulses during a frame period in order to perceive the correct brightness impression. In FIG. 4, it is indicated how the temporal centre of gravity CG1, CG2, CG3 of light emission varies when the video level is incremented one by one in case of a basic sub-field code like the well-known binary code. A vertical line indicates the temporal centre of gravity. A dark shaded sub-field means that during this sub-field the light generation is activated whereas a light shaded sub-field means that there is no light generation in this sub-field period. From FIG. 4, it is evident that the temporal centre of gravity CG1, CG2, CG3, etc. is not growing smoothly (monotonously) with the video level. And it is this behaviour that makes this type of sub-field coding sensitive to false contour effect. The mathematical exact definition of the temporal centre of gravity of the light generation according to a sub-field code word is defined in the following formula:

$$CG(\text{code}) = \frac{\sum_{i=1}^{n} sfW_i * \delta_i(\text{code}) * sfCG_i}{\sum_{i=1}^{n} sfW_i * \delta_i(\text{code})}$$

Figure 5:
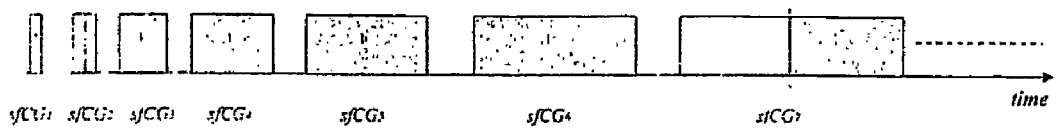
FIG. 5 shows the center of gravity time positions for the sub-fields within a sub-field organization.

In this formula $sfW_i$ is a sub-field weight of the $i^{th}$ sub-field, $\delta_i$ is equal to 1 if the $i^{th}$ sub-field is "switched on" according to the sub-field code word and 0 otherwise. The temporal centre of gravity of the $i^{th}$ sub-field is named $sfCG_i$ in this formula. FIG. 5 shows for each sub-field in a sub-field organization its corresponding temporal centre of gravity, again indicated by a vertical line.

In the next figure, FIG. 6, the temporal centres of gravity of all 256 video levels are shown in form of a curve for a sub-field organization with 11 sub-fields and sub-field weights as shown below:

| 1 | 2 | 3 | 5 | 8 | 12 | 18 | 27 | 41 | 58 | 80 |
|---|---|---|---|---|----|----|----|----|----|----|

The temporal centre of gravity is calculated with the formula presented above. The curve in FIG. 6 is by far not monotonous and includes a lot of jumps. These jumps cause false contour effect, the gravity centered coding scheme suppress these jumps by selecting only some video levels, for which the corresponding sub-field code words have temporal centres of gravity, which will grow smoothly. This can be done by drawing a monotone curve without jumps in the previous graphic and selecting in each case the nearest point. A lot of best fitting techniques are known for this purpose from the mathematics, e.g. Gaussian fit method, which relies on minimization of the square errors. Of course, this is only one embodiment of the invention. An example of a monotonous curve is shown in FIG. 7. The selected video levels for the sub-set of video levels are indicated with small black squares.

A basic GCC coding has been described above. However, in the present invention, other embodiments may be used based on the following assumption. In the low video level range it is not always sufficient to respect the above mentioned rule to only select those video levels where the temporal centre of gravity is smoothly growing, because in this range the number of possible levels is low and so if only growing temporal centre of gravity levels were selected, there would not be enough video levels to provide a good video quality in dark pictures, since the human eye is very sensitive in the dark video picture range. On the other hand the false contour effect in the dark video picture range is negligible anyhow, so that it is acceptable that in this range the above-mentioned rule is violated.

Figure 6:
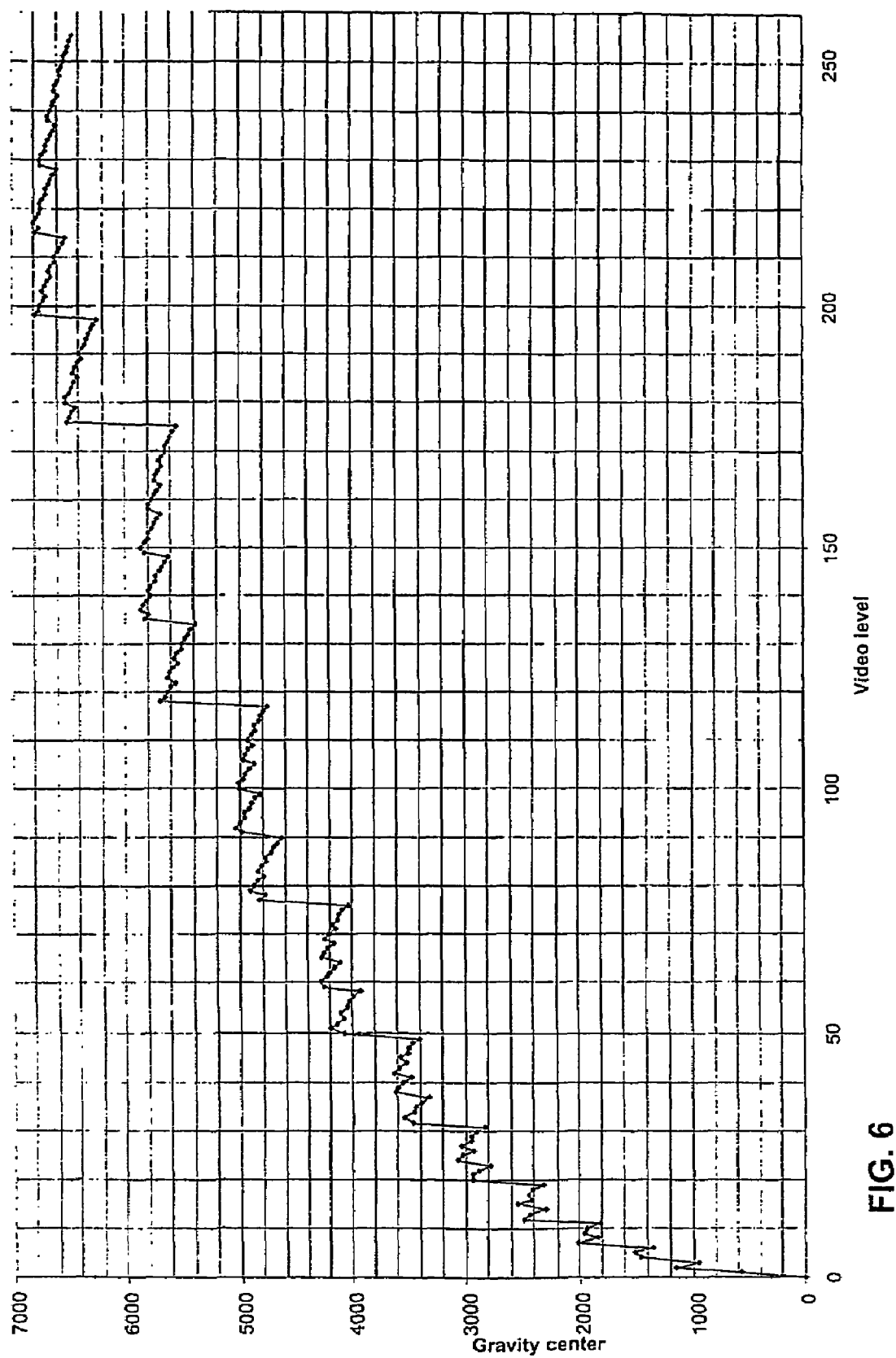
FIG. 6 illustrates the behaviour of the center of gravity variation in a temporal gravity center versus video level curve.
Figure 7:
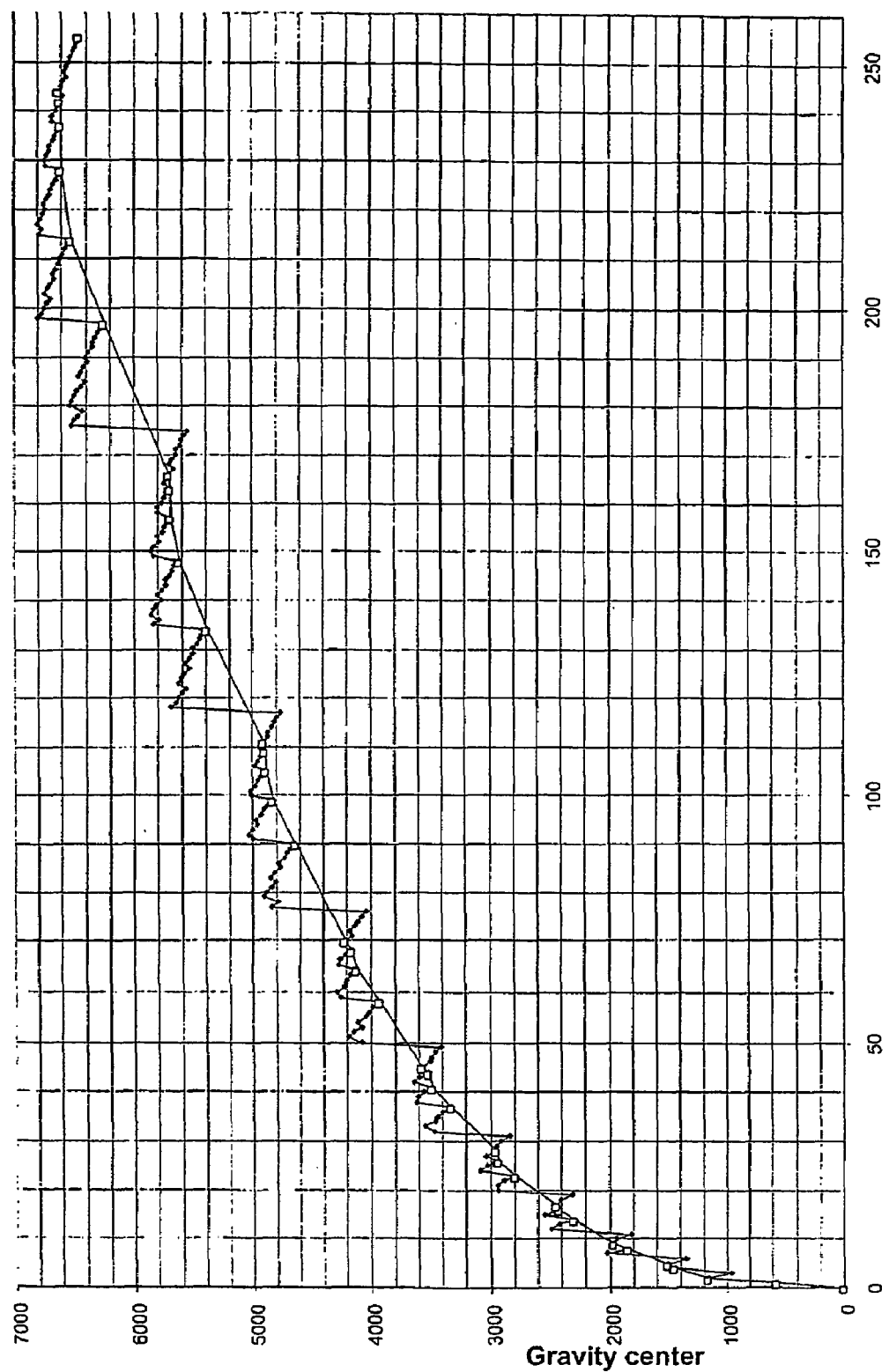
FIG. 7 shows a monotone rising curve with the selected points in the temporal center of gravity versus video level coordinate system and the sub-set of selected points for sub-field encoding.

In the high video level range, there is a decrease of the temporal centre of gravity, which is evident when looking at FIG. 6. As soon as the sub-field with the highest sub-field weight is lighted, only some lower sub-fields can be lighted having a previous time position, which leads to a reduction of the overall temporal centre of gravity for the light emissions. Thus, also in this video level range the above given rule cannot be respected. In this area, the human eye is not very sensitive of distinguishing the different video levels and, therefore, it is not so important that the above-mentioned rule is respected. The occurring false contour effect is negligible in this video level range. This is in accordance with the Weber-Fechner law, which specifies that the eye is only sensitive to relative video amplitude changes. In the high video level range the relative video amplitude changes are low in comparison to the low or mid video level range. For these reasons, the above mentioned rule, that only those video levels and corresponding sub-field code words are selected for setting up the sub-set of video levels can be revised to the less strict rule that the monotony of the curve is only required in the video level range between a first and a second limit. With experiments it has been verified that for example 10% of the maximum video level is an appropriate level for the low video level range and 80% of the maximum video level is an appropriate level for the high video level range.

So, according to an exemplary embodiment, the field of possible sub-field code words is reduced by only taking the minimum weight code words (mWC). These code words are all those code words, which have the smallest sub-fields activated for light emission for each video level, i.e. the one, which has the minimum binary value. This coding principle is better explained with an example. The following sub-field organization is considered also for this example:

| 1 | 2 | 3 | 5 | 8 | 12 | 18 | 27 | 41 | 58 | 80 |
|---|---|---|---|---|----|----|----|----|----|----|

The numbers represent the sub-field weights. With this sub-field organization the video level 23 can be coded with the following codes:

| 0 | 0 | 0 | 1 | 0 | 0 | 1 | 0 | 0 | 0 | 0 |
|---|---|---|---|---|---|---|---|---|---|---|
| 0 | 1 | 1 | 0 | 0 | 0 | 1 | 0 | 0 | 0 | 0 |
| 0 | 0 | 1 | 0 | 1 | 1 | 0 | 0 | 0 | 0 | 0 |
| 1 | 1 | 0 | 0 | 1 | 1 | 0 | 0 | 0 | 0 | 0 |
| 1 | 1 | 1 | 1 | 0 | 1 | 0 | 0 | 0 | 0 | 0 |

From this set of sub-field code words the last one in bold letters is the minimum weight code word. This code has the most entries in the least significant bits. Please note that the LSB is on the left side in this table.

For achieving the best response fidelity for the plasma cells it is advantageous that the selected codes also respect the rule that in each sub-field code word there should never be more than one consecutive 0 entry between two 1 entries, which means that there is never more than one inactivated sub-field between two activated sub-fields for the plasma cell addressing. Such codes are also called refreshing codes because the plasma cells are activated in short succession, therefore, the charge in the cell cannot vanish during a relatively long inactivated period. This concept is already explained in another European Patent Application of the applicant, having the application number 00250066.8. For the disclosure of this refreshing concept it is, therefore, also expressively referred to this European Patent Application. The mWC code words already respect this rule so that every video level can be used which has a corresponding mWC code word. In case of a different sub-field organization, it may be necessary to further limit the mWC code words according to the "single inactivated sub-field rule" in order to get the same result. But this further limitation does not reduce the number of chosen levels a lot and, therefore, it does not cost a lot of flexibility. But on the other hand it brings the important advantage that the response fidelity of the plasma cells is subjectively increased.

However, in the GCC scheme, less than 256 wide levels are available. Then, in order to display more than 8-bit video with this encoding concepts, it is necessary to use dithering methods. Furthermore, even static pictures will require dithering because of the degammatization process. As known, PDPs are almost linear and require an artificial gamma function as standard pictures are already pre-corrected. This artificial quadratic gamma function will reduce the amount of information in the dark levels. Dithering methods can be used to recover such information.

So, according to another feature of the invention, the method may comprise an additional step wherein it is determined if static and moving pictures are noisy pictures or free noisy pictures and wherein, in view of the result, a specific dithering method is used. More specifically, the method of the present invention is defined as follow:

Standard sub-field encoding for static pictures
    specific dithering algorithm optimised for noisy static pictures,
    specific dithering algorithm optimised for noise-free static pictures.
Gravity Centered Coding (GCC) for moving pictures:
    specific dithering algorithm optimised for noisy moving pictures,
    specific dithering algorithm optimised for noise-free moving pictures.

Figure 8:
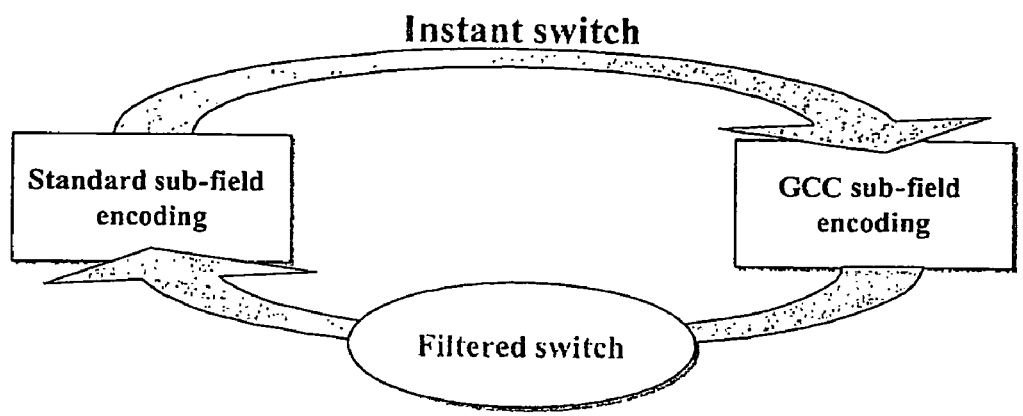
FIG. 8 illustrates the decision concept according to a preferred embodiment of the present invention.

So, depending on the picture activity:

Motion or not, noise or not, a decision should be taken concerning the type of encoding method which should be used. Furthermore, it should be added that a GCC encoding is directly based on a standard encoding since it is a sub-set of the standard encoding, therefore a switch between one mode and the other could be made without any perceptible effect. However, if a GCC is applied on static pictures, the picture will be only slightly noisier whereas if a standard coding is applied on a moving picture, disturbing false contour effect will appear. Therefore, the switch standard code to GCC should happen with high priority whereas the switch GCC back to standard should happen only if enough information is available. This is shown in FIG. 8.

Various algorithms for detecting motion and/or noise will be described now in the case of PDP screens using specific ICs called front IC or flat display IC, such IC being in possession of a frame memory and delivering information concerning motion and noise.

The invention will be implemented, for example, in a PDP screen that is a progressive display with a fixed resolution.

Therefore a lot of video conversion should be planned for a product as listed below:

Video format conversion from the input format to the native resolution of the screen. This is mainly required for PC application having a plurality of video format: VGA, XGA, SXGA . . .

Frame format conversion from various input frame frequencies (from 50 Hz up to 120 Hz) to one of the available modes (50 Hz, 60 Hz, 75 Hz). This is mainly required for PC sources coming from various graphic cards.

Progressive conversion from interlaced sources coming mainly from video systems (cable TV, video-recorder, DVD player . . . ).

The above functions are available on the front IC.

Figure 9:
FIG. 9 illustrates a motion detection algorithm used in the present invention.

According to the concept shown in FIG. 8 and mentioned above, as soon as any information about motion is available (i.e. MOTION=ON), the GCC coding is activated (instant switch). In the other case, the decision about no motion is filtered. This is mandatory to avoid any oscillation in the decision. The filtering method is illustrated in FIG. 9 and comprises the following steps:

For each frame:
If MOTION is ON then MOTION_counter=2×MOTION_ LIMIT
If MOTION is OFF then MOTION_counter=MOTION_counter−1
When MOTION_counter<MOTION_LIMIT then active Standard coding else stay in GCC.

MOTION_counter is a counter which can only move between 0 and 2×MOTION_LIMIT.

Therefore if MOTION_counter<0 then MOTION_counter=0.

Figure 10:
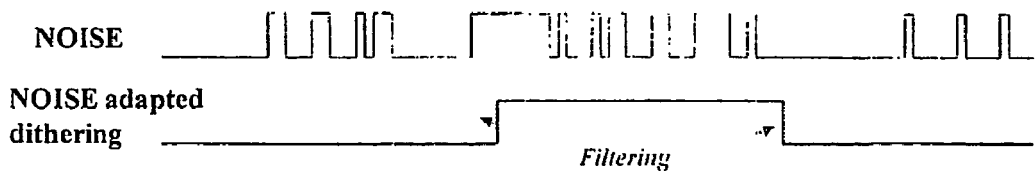
FIG. 10 illustrates a noise detection algorithm used in the present invention.

In the case of noise, a similar principle is used for a decision concerning the dithering method to be used. As already explained, depending on the information of noise and motion, an optimal dithering method can be chosen amongst the various dithering methods implemented in the Plasma IC. In order to avoid any kind of oscillation, a filtering of the noise decision is implemented as shown in FIG. 10. An example of the process is given hereafter.

For each frame,
If NOISE is ON then NOISE_counter=NOISE_counter+1
If NOISE is OFF then NOISE_counter=NOISE_counter−1
When NOISE_counter>NOISE_LIMIT then active adapted noise dithering else stay in noise-free dithering.

NOISE_counter is a counter which can only move between 0 and 2×NOISE_LIMIT. Therefore if MOTION_counter<0 then MOTION_counter=0 and if NOISE_counter>2×NOISE_LIMIT then NOISE_counter=2×NOISE_LIMIT.

Various dithering methods can be used. The adaptive noise dithering may use, for example, an error diffusion algorithm as described in "R. W. Floyd and L. Steinberg, Dig. Tech. Papers pp 36-37, 1975". The noise free dithering may be, for example, a 3D dithering method as described in EP No. 00 250 099.9 or in EP No. 01 250 199.5 of the same applicant.

Figure 11:
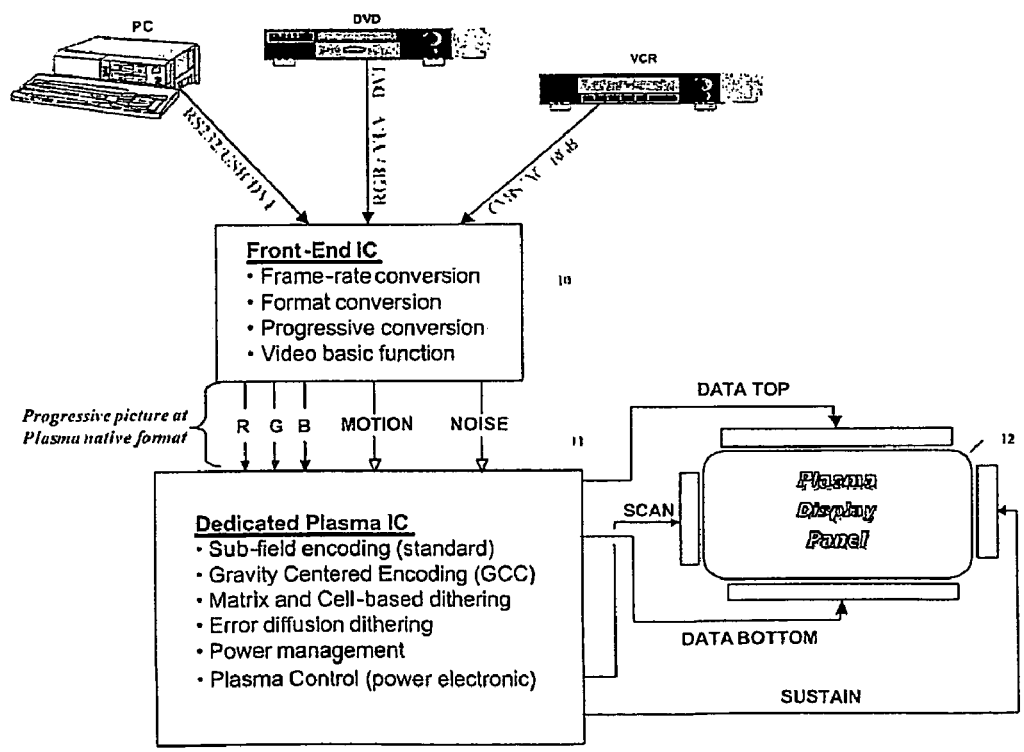
FIG. 11 is a general block diagram for the implementation of the invention when the motion information and the noise information are available from the Front End IC.

A possible implementation of the present invention will be described with reference to FIG. 11. In this embodiment, as mentioned above, the system comprises a Front-end IC 10. This IC 10 is in charge of several functions such as frame-rate conversion, format conversion, progressive conversion, video basic function. The front-end IC 10 receives signals from various inputs such as PC, DVD players, VCR and so on. The IC 10 outputs progressive signals (R, G, B) in a native format of the PDP and at the right frame rate to the dedicated plasma IC 11. It also outputs information on NOISE and MOTION. The dedicated Plasma IC 11 contains a lot of algorithms such as sub-field encoding (standard), gravity centered encoding (GCC), matrix and cell-based dithering, error diffusion dithering. It also contains a power management circuit and plasma control circuits. Based on the motion and noise information delivered by the front-end IC 10, the dedicated plasma IC 11 can decide which kind of algorithms should be used. As shown in FIG. 11, from the IC 11, the data information as well as the scan and sustain pulses are sent to the drivers of a plasma screen 12.

Figure 12:
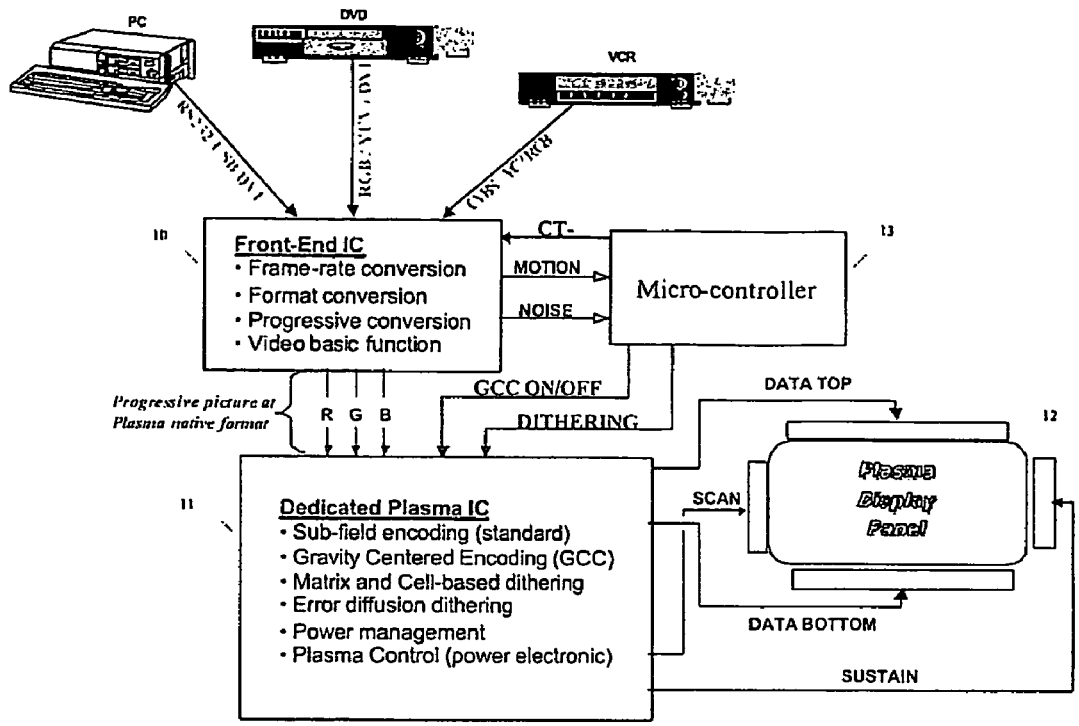
FIG. 12 is a general block diagram for the implementation of the invention according to another embodiment.

FIG. 12 represents another possible implementation. In this case, a microcontroller 13 is implemented between the front-end IC 10 and the dedicated plasma IC 11. The NOISE and MOTION information are sent to the microcontroller 13. The micro-controller will manage the various settings of the plasma dedicated IC while choosing between:

GCC ON or OFF depending on motion bit from Front-End IC

Optimized dithering algorithm.

The microcontroller will be in charge of the decision filtering.

Moreover, the various settings of the Front-End IC are also under the responsibility of this microcontroller by the data CT.

There will be described now a simple method to detect motion and noise inside the dedicated plasma IC. This should be useful in a configuration having no external information about motion or noise. The specific methods will be described with reference to FIGS. 13 to 19.

Figure 13:
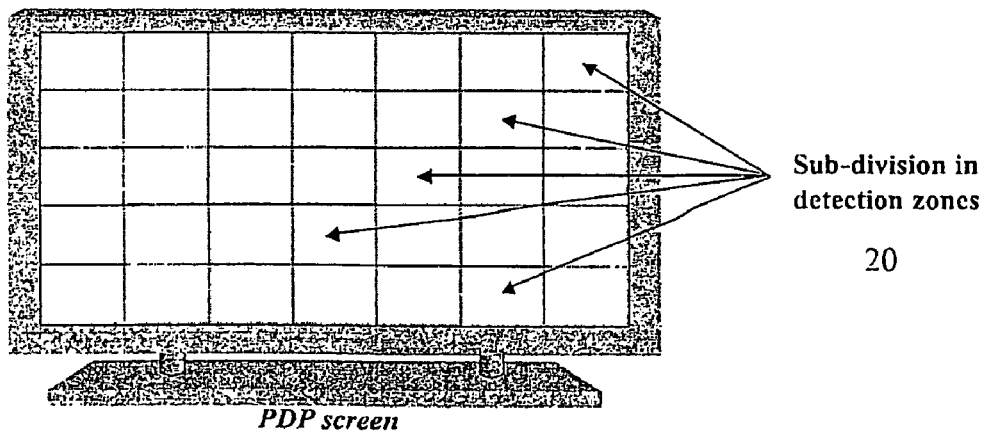
FIG. 13 illustrates the sub-division of a picture in detection zone when no external information about motion and/or noise is available

In fact, the concept is based on the split of the input pictures in various detection zones 20 as shown on FIG. 13. On this figure, the sizes as well as the number of zones are only given as example and, as known from the man skill in the art, other kinds of forms, size and number can be considered.

First of all, a motion detection method based on a histogram computing will be described. So, for each zone 20 defined by its coordinates Z(i,j), an histogram of the zone content is computed. This histogram is a kind of representation of the zone and will be used later on for activity detection.

Figure 14:
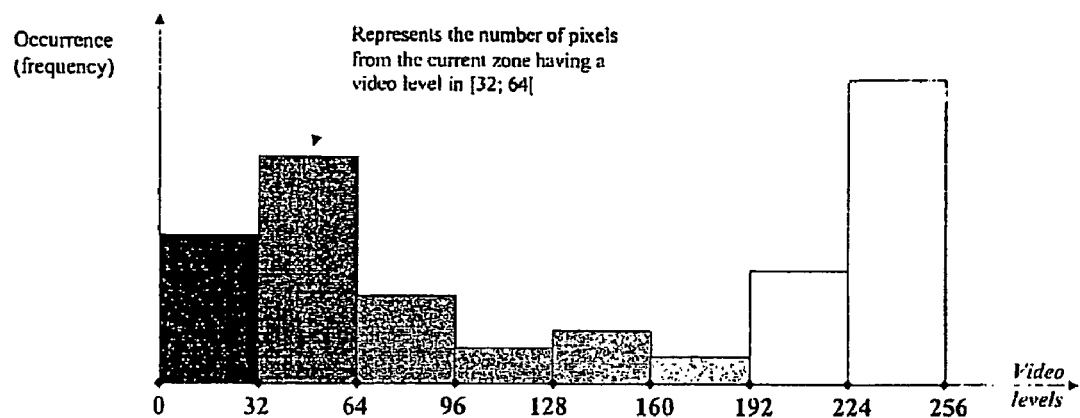
FIG. 14 is an histogram representing the zone content.

A histogram of the zone will be firstly defined by choosing a number of discrete region each one defined by a lower and an upper video frontier as shown on FIG. 14.

In the previous example, one zone is described by a set of 8 values, each one giving the number of pixels located in a defined range (e.g. range [32; 64]). Such a histogram will be computed for each zone and memorized.

The previous example presented a picture characterization having 8 equivalent regions. Obviously, the number of region as their respective sizes can vary while being still covered by the present invention.

Now, for each zone, the histogram will be compared with the corresponding histogram of the previous frame. A limit is set in order to decide whether there is a strong change or not. An example of decision is given below for a frame n:

```
DifferenceZone=0
For each zone Z(i;j,n)
{
    DifferenceRegion=0
    For each region R[k,n]
    {
        If (|R[k;n]-R[k;n-1]| > RegionLimit) then
        DifferenceRegion++
    }
```

-continued

```
    if (DifferenceRegion > ZoneLimit)
        then DifferenceZone++
}
If (DifferenceZone > FrameLimit) then Motion = ON else
Motion=OFF
```

Obviously a filtering of this decision as presented above should be further used to avoid oscillation, i.e, appearing and disappearing of false contour. Such an algorithm is quite simple but this is sufficient since the change between a standard coding and a GCC coding is invisible. The advantage of such an algorithm is the lack of frame memory since only histograms are memorized which represents only few bits of on-chip memory.

Now, a noise detection method which should be implemented inside the dedicated plasma IC will be described with reference to FIGS. 15 to 18.

This method is based on the fact that there are a lot of similarities between two consecutive lines where only the noise makes the strongest difference.

Figure 15:
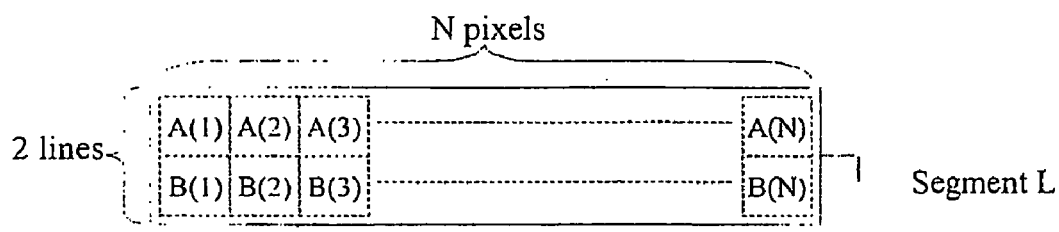
FIG. 15 illustrates the segmentation of a picture for noise detection

For that purpose we will define the concept of segment as following:

According to FIG. 15, a segment L is an ensemble of N pixels taken from two consecutive lines.

The noise estimation for that segment L can be defined as following:

$$\text{Noise}(L) = \frac{1}{N} \sum_{i=1}^{i=N} (A(i) - B(i))^2.$$

The noise estimation for the whole frame will be defined as the minimum value of this noise estimation: Noise=$\min_L$ (Noise(L)).

In order to have the better accuracy, the various segment L will be spread around the whole frame. Some example of such a spreading is shown on FIG. 16.

Figure 16:
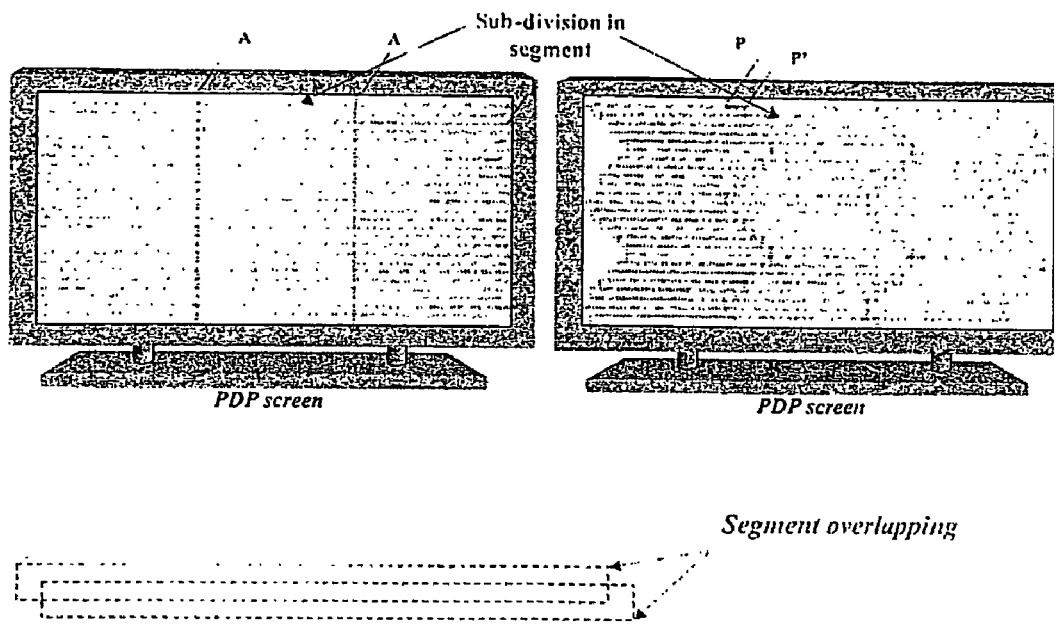
FIG. 16 shows various ways for implementing the segmentation

On the left figure, the sub-division in segment is done by vertical lines A, A. On the right figure, the segments are shifted from one line to the other. The shifting may be of 1 or more pixels in the row direction as referenced by P,P'. Furthermore, some kind of overlapping between the segment should be planed to avoid any problem due to the proscan conversion or due to specific artificial test patterns. This overlapping is illustrated at the bottom of FIG. 16. In this case, one line or row is common to two adjacent segments in the vertical direction.

Figure 17:
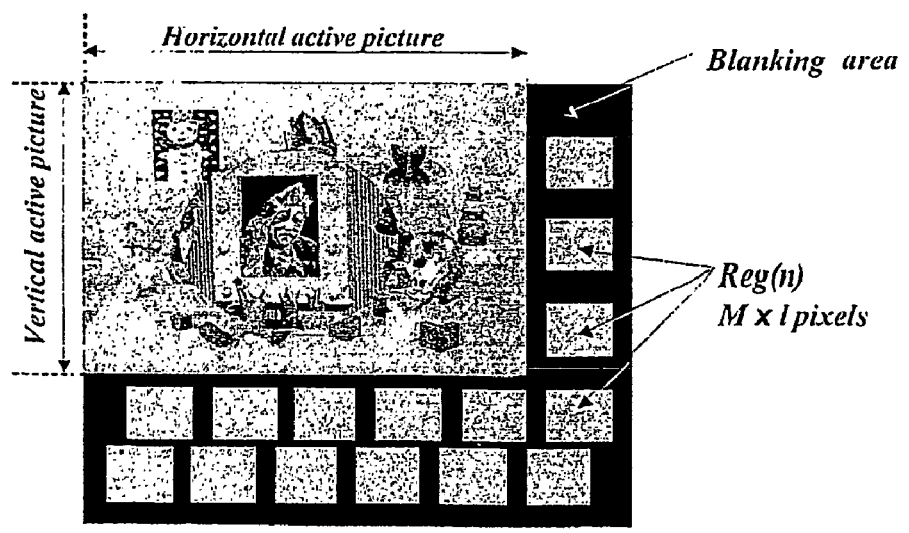
FIG. 17 shows a typical picture sent to a plasma panel.

Moreover, in the field of the noise detection, an additional estimation of the noise level can be performed on the inactive part of the picture. Such an estimation is less precise since, in case of digital pictures, the inactive part are artificially generated (e.g. DVD player). The FIG. 17 represents a typical picture sent to the plasma.

The blanking area can have various sizes but this could be used for noise estimation. For that purpose, n analyzing regions will be defined in this blanking area called Reg(n) made of m pixels×l lines as shown on the FIG. 17. In order to process a noise estimation, a first computation will determine the mean values of each region as following:

$$MGL(n) = \frac{1}{m \times l} \sum_{i,j} Pict(i, j)$$

Where i and j represents the various horizontal and vertical pixels positions of each region. Then, for each region, the mean square error will be computed as following:

$$MSE(n) = \frac{1}{m \times l} \sum_{i,j} (Pict(i, j) - MGL(n))^2$$

This value is a direct characterization of the noise since the signal to noise ratio is mainly defined as $$PSNR = 10 \cdot \log_{10}\left(\frac{255^2}{MSE}\right).$$

Figure 18:
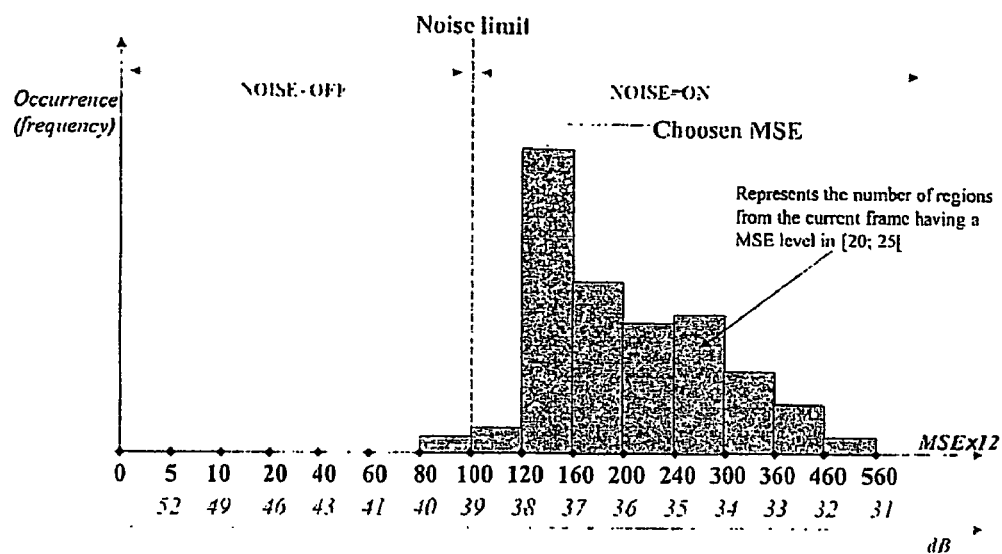
FIG. 18 is an histogram used in the noise detection algorithm.

Nevertheless, in the present concept, the MSE(n) have been computed for each analyzing regions. In order to estimate the final noise, a new concept is based on a histogram representation of this various MSE to extract the most accurate information. As shown in FIG. 18, the minimum value of the histogram is defined by the minimal error located in a digital picture defined by $$MSE_{min} = \frac{1}{12}$$

since $$MSE_{min} = \int_{-1/2}^{1/2} (x^2) dx = \left[\frac{x^3}{3}\right]_{-1/2}^{1/2} = \frac{1}{3} \cdot \left[\frac{1}{8} - \frac{1}{-8}\right]$$

where $x^2$ represents the square error integrated among the error dynamic; the error dynamic being $[-\frac{1}{2};\frac{1}{2}]$ with a quantification step of 1. In this case, the maximal PSNR will be $PSNR_{max}=10\cdot\log_{10}(12\cdot 255^2)=58.92$ dB.

On the horizontal axis of the histogram, various segments are chosen representing a domain of the value MSE×12.

For instance, when 20≦MSE<25, then 240≦12× MSE<300. More precision is not necessary since only a noise estimation is required.

In the vertical axis, the occurrence of each domain is computed as following:

---

For all region n
{
    For all domain k
    {
        if (Min(k) < MSE(n) < Max(k)) then Histo[k]++
    }
}

---

Then, the highest value in the occurrence of the histogram is chosen to quantify the MSE of the whole picture: in the present example the chosen MSE corresponds to a PSNR between 37 and 38 dB. Afterwards, depending on a noise limit, it is decide whether there is noise (NOISE=ON) or not (NOISE=OFF) in the picture: if MSE>Noise_Limit then NOISE=ON else NOISE=OFF.

Obviously, this parameters NOISE should be filtered as the parameter MOTION to avoid oscillation.

Figure 19:
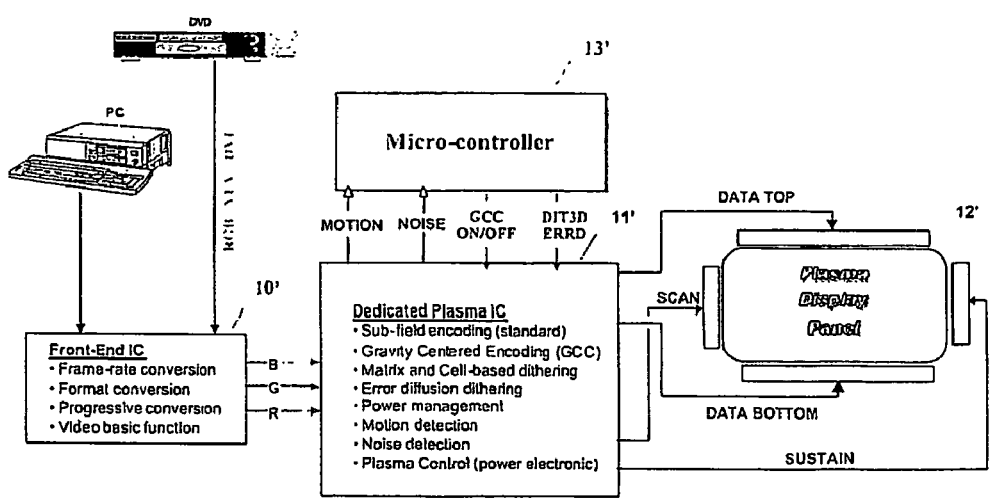
FIG. 19 is a general block diagram for the implementation of the invention when the motion information and/or the noise information are detected using the algorithms illustrated with FIGS. 13 to 18.

Finally, the overall decision for modes activating can be taken internally or can be sent to an external micro-controller as shown in FIG. 19.

On FIG. 19, a possible implementation of the above methods is illustrated. In this case, the Front End IC 10' is dedicated to frame rate conversion, format conversion, progressive conversion, and video basic function. It receives input signals, for example a PC or a DVD and outputs R, G, B data to the dedicated plasma IC 11'. The IC 10' has no information on motion or noise.

In fact, the dedicated plasma IC 11' is devoted to the analysis of the incoming picture. It outputs the result of the methods described above, i.e. MOTION and NOISE signals to the microcontroller 13'. The microcontroller will send information relating to GCC ON/OFF and to EDRD or DIT3D. So the microcontroller is in charge of the final algorithm selection as mentioned above. As usual, the plasma IC 11' will send data information and scan and sustain signals to the drivers of the plasma display panel 12'.

The advantage of methods described above is that they do not require any frame memory. They use a histogram that can be memorized with only few bits on the already existing on-chip memory.

Obviously, the use of an additional frame memory can enhance and refine the detection but this represents an additional cost to the plasma electronic. Such a method will be now described. For that purpose the picture will be divided in small blocks called Block(n). For each blocks an estimation of the mean square error will be performed as following:

$$MSE(n) = \frac{1}{N} \sum_{Block(n)} (Pict(i, j, t) - Pict(i, j, t-1))^2$$

where t represents the current frame and t−1 the previous one, i and j being the horizontal and vertical position of each pixel.

The smallest MSE(n) for all Block(n) will define the noise level.

When these MSE are bigger than a limit MOTION_BLOCK, a MOTION_counter will be increased: if MSE(n)≧MOTION_BLOCK then MOTION_counter++, the MOTION_counter being initialized at the beginning of every frame.

When MOTION_counter≧MOTION_limit MOTION=ON else MOTION=OFF.

Even in that case where more information is available, an adapted filtering of the decision as presented above should be further performed. Indeed in case of film input pictures are repeated in the following manner: A A B B . . .

In that case, the comparison between pictures A and A or between pictures A and B won't give the same information. Then only the comparison A with B will give relevant information. If no filtering is used, an oscillation would appear every frame.

The method presented above requires few computation and therefore stays quite simple.

Figure 20:
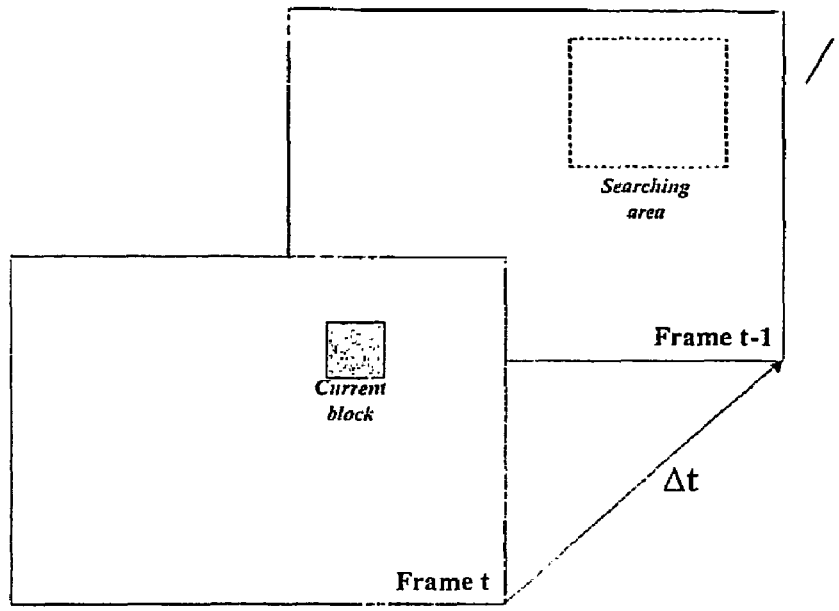
FIG. 20 illustrates a new concept for motion or noise detection based on block matching.

A more complex method is presented now with reference to FIG. 20, This requires frame memory as well as complex computation which increases the cost of such and algorithm.

In this case, the current frame t can be compared with the previous one t−1.

Since, there are movements and deformations of the picture no direct comparison pixel to pixel is possible. In that case, an estimate of the noise and of the motion level for each block of the current frame is done by searching in an area of the previous frame a block of the same size minimizing the MSE. The minimum MSE will corresponds to the noise level since the motion has been recovered. Obviously, complex motion and deformation cannot be completely recovered and therefore, the estimate of the noise will be done by using a histogram as presented above (noise estimation of blanking areas) as illustrated on FIG. 18. The main idea is that the highest occurrence of the histogram will corresponds to the noise whereas the other values will mainly corresponds to error due to deformations and complex motions.

This method is based on a so-called block-matching algorithm.

The current frame will be divided in small blocks called Block(n) and for each corresponding block of the searching area in the previous frame a MSE will be computed:

$$MSE(\delta x, \delta y, n) = \frac{1}{N} \sum_{Block(n)} (Pict(i, j, t) - Pict(i - \delta x, j - \delta y, t - 1))^2$$

where N represents the size of the block n.

Then, for each position in the searching area $(\delta x, \delta y)$ the smallest MSE will be computed for the block n. This $MSE_{min}(n) = \min_{\delta x, \delta y}(\delta x, \delta y))$ will be chosen for the noise estimation. In addition if the minimal value of the MSE is achieved for a position $(\delta x, \delta y)$ different from $(0,0)$ then Motion(n)=1 else Motion(n)=0.

As previously said, the various $MSE_{min}(n)$ will be used to compute an histogram of errors exactly as shown above for the noise estimation of blanking area.

Moreover a value $$Motion\_Sum = \sum_{All\ blocks\ n} Motion(n)$$

will be computed and compared to a limit so that if Motion_Sum≧Motion_Limit then MOTION=ON else MOTION=OFF.

Figure 21:
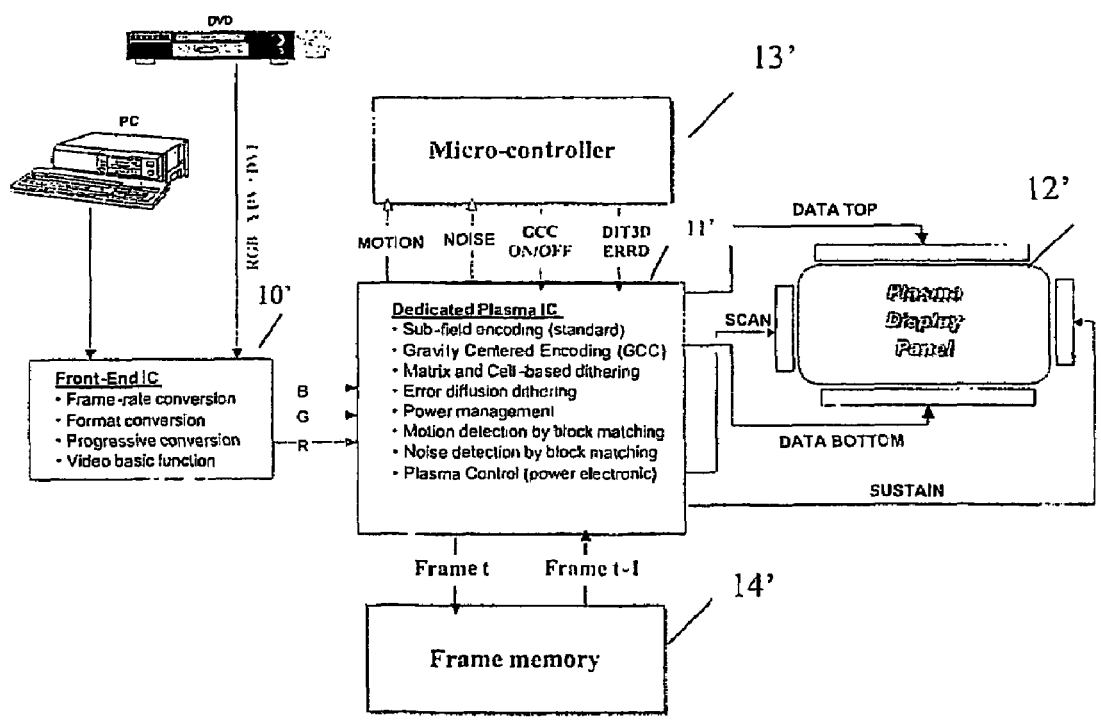
FIG. 21 is a general block diagram for the implementation of the concept of FIG. 20.

The above method may be implemented in the system shown in FIG. 21. The system differs from that of FIG. 19 in the adjunction of a frame memory 14' for storing consecutive frames (Frame t) in order to output to the plasma IC 11' the previous frame (Frame t−1).

Further hardware simplification of the concept can be made by using less pixels information (e.g. by a down-sampling of the pictures) or by using only luminance information . . .

Obviously, even in that case where more information is available, an adapted filtering of the decision as presented above should be further performed. Indeed in case of film input pictures are repeated in the following manner: A A B B . . .

In that case, the comparison between pictures A and A or between pictures A and B will not give the same information. Then only the comparison A with B will give relevant information. If no filtering is used, an oscillation would appeared every frame.

The above methods present several advantages:
Improve the overall PDP grayscale portrayal both for moving and non-moving pictures.
Various algorithms are presented with various complexity levels
The final decision of the most adapted mode can be made in an external micro-controller enabling a much better fine-tuning and adaptation to product requirements.

However, depending on the chosen algorithm, more or less resources are required on the specific chip. Furthermore, the last proposed method requires an additional external frame memory.

The invention claimed is:

1. A method for processing video pictures for display on a display device having a plurality of luminous elements corresponding to the pixels of a picture wherein the time of a video frame or field is divided into a plurality of N sub-fields during which the luminous elements can be activated for light emission in small pulses corresponding to a sub-field code word of n bits used for coding the p possible video levels lighting a pixel, comprising the steps of:
   determining if pictures are static pictures or moving pictures,
   in case of static pictures, processing video pictures using a first sub-field encoding method adapted to pictures when no motion is detected, and
   in case of moving pictures, processing video pictures using a second sub-field encoding method reducing dynamic false contour effect adapted to pictures when motion is detected.

2. A method according to claim 1, wherein the first sub-field encoding method is a standard encoding method wherein the n bit video level is decomposed in n or more lighting sub-periods or sub-fields.

3. A method according to claim 1, wherein the second sub-field encoding method is a method wherein among the set of p possible video levels for lighting a pixel, a sub-set of m video levels with n<m<p is selected, which is used for light generation, wherein the m values are selected according to the rule that the temporal centre of gravity for the light generation of the corresponding sub-field code words grow continuously with the video level apart in the low video level range up to a first predefined limit and/or in the high video level range from a second predefined limit on.

4. A method according to claim 3, wherein the temporal centre of gravity for the light generation is defined according to the following formula:

$$CG(code) = \frac{\sum_{i=1}^{n} sfW_i * \delta_i(code) * sfCG_i}{\sum_{i=1}^{n} sfW_i * \delta_i(code)}$$

there $sfW_i$ is the sub-field weight of the $i^{th}$ sub-field, $i^{th}$ is equal to 1 if the $i^{th}$ sub-field is activated and zero if the $i^{th}$ sub-field is inactivated and $sfCG_i$ is the temporal centre of gravity for the light generation of the $i^{th}$ sub-field.

5. A method according to claim 3, wherein, in case of a sub-field organization characterised by a specific number of sub-fields with a specific series of sub-field weights for a colour component value, more than one corresponding sub-field code word exists, the set of possible sub-field code words is reduced by taking only those sub-field code words for each video level, which have the minimum binary value for the case that in a sub-field code word the weight of each bit is ordered according to size.

6. A method according to claim 5, wherein the selection of video levels from the further reduced set of sub-field code words is performed by taking only one video level on each group of sub-field code words having the same radical on the MSB side, namely the video level belonging to the next higher group of sub-field code words and having the smallest centre of gravity superior to the centre of gravity of the previous selected video level, wherein in case that the next higher group of sub-field code words does not provide a sub-field code word having a centre of gravity inferior to the previous one, then the second next higher sub-field code word group will be chosen for selecting the next video level and so on.

7. A method according to claim 1, wherein the method comprises an additional step of determining if static and moving pictures are noisy pictures or free noise pictures and using an adaptive noise dithering for noisy pictures or a noise free dithering for noise free pictures.

8. A method according to claim 7, wherein the adaptive noise dithering is an error diffusion algorithm.

9. A method according to claim 7, wherein the noise free dithering is a 3D dithering.

10. A method according to claim 1, wherein, when information about motion is available, the decision to switch between the first sub-field encoding method and the second sub-field encoding method in view of the detection of the motion is done according to the following algorithm
for each frame,
if MOTION is ON then MOTION-counter=2×MOTION-LIMIT,
if MOTION is OFF then MOTION counter=MOTION counter−1,
when MOTION-counter<MOTION-LIMIT then the first coding sub-field method is activated else the second coding sub-field method is maintained, the Motion-counter being a counter able to count from 0 to 2×MOTION-LIMIT, if MOTION-counter<0 then MOTION-counter=0.

11. A method according to claim 1, wherein, when information about noise is available, the decision to switch between an adaptive noise dithering and a noise free dithering is done according to the following algorithm:
for each frame,
If NOISE is ON then NOISE-counter=NOISE-counter+1,
If NOISE is OFF, then NOISE-counter=NOISE-counter−1,
when NOISE-counter>NOISE-LIMIT, an active adapted noise dithering is activated else a noise free dithering is used, the NOISE-counter being a counter able to count from 0 to 2×NOISE-limit, if NOISE-counter<0 then NOISE-counter=0 and if NOISE-counter>2×NOISE-LIMIT then NOISE-counter=2×NOISE-LIMIT.

12. A method according to claim 1, wherein, when no information about motion is available, the motion detection is done by using the following method comprising the steps of:
splitting picture in M detection zones Z(i,j);
computing for each detection zone Z(i,j) an histogram of the zone content,
for each zone, comparing the computed histogram with the corresponding histogram of the previous picture,
if the difference is above a given limit, then putting Motion ON.

13. A method according to claim 12, wherein the histogram of the zone is defined by choosing a number of discrete regions, each one defined by lower and upper video frontiers.

14. A method according to claim 12, wherein, the determination of motion in picture is done by the following algorithm:

```
DifferenceZone = 0
For each zone Z(i;j,n)
{
    DifferenceRegion = 0
    For each region R[k,n]
    {
        If (|R[k,n] − R[k,n−1]| > RegionLimit)
        then DifferenceRegion + +
    }
    If (DifferenceRegion > ZoneLimit) then DifferenceZone + +
}
        If (DifferenceZone>FrameLimit) then Motion=ON else
Motion=OFF.
```

15. A method according to claim 1, wherein, when no information about noise is available, the noise detection is done with a method comprising the following steps of:
dividing the picture in segments L constituted by a set of N pixels taken from two consecutive lines,
calculating a noise estimation for the segment L:

$$\text{Noise}(L) = \frac{1}{N}\sum_{i=1}^{i=N}(A(i) - B(i))$$

defining the noise estimation for the whole picture as the minimum value of the noise estimation Noise=$\min_L$ (Noise (L)),
and comparing the value Noise to a threshold to determine if Noise is ON or OFF.

16. A method according to claim 1, wherein, when no information about noise is available, the noise detection is done with a method:
defining in blanking area of a picture, n' regions Reg(n') made of m pixels×l lines,
computing the mean values of each region with the following formula:

$$MGL(n') = \frac{1}{m \times l}\sum_{i,j} Pict(i; j)$$

where
i and j represent the various horizontal and vertical pixel positions of each region:
computing, for each region, the mean square error:

$$MSE(n') = \frac{1}{m \times l}\sum_{i,j}(Pict(i; j) - MGL(n^1))^2,$$

then
estimating the final noise of the whole picture.

17. A method according to claim 16, wherein, the estimation of the final noise is done using a histogram representation of the various mean square errors MSE(n'), the minimum value in this histogram being defined by the minimal error located in a digital picture given by $$MSE_{min} = \frac{1}{12}$$

since $$MSE_{min} = \int_{-1/2}^{1/2} (x^2) dx = \left[\frac{x^3}{3}\right]_{-1/2}^{1/2} = \frac{1}{3} \cdot \left[\frac{1}{8} - \frac{1}{-8}\right]$$

where $X^2$ represents the square error integrated among the error dynamic; the error dynamic being $[-½;½]$ with a quantification step of 1,
  on the horizontal axis of the histogram, choosing various segments representing a domain of the value MSE×12,
  in the vertical axis, computing the occurrence of each domain as following:

```
For all region n
{
    For all domain k
    {
        if (Min(k) < MSE(n) ≦ Max(k)) then Histo[k] + +
    }
}
```

Then, choosing the highest value in the occurrence of the histogram to quantify the MSE of the whole picture;
depending on a noise limit, if MSE>NOISE-limit then NOISE=ON else NOISE=OFF.

18. A method according to claim 1, wherein, when no information about noise is available, the noise detection is done with a method comprising the following steps:
  dividing each picture in small blocks Block(n),
  for each block, performing an estimation of the mean square error:

$$MSE(n) = \frac{1}{N} \sum_{Block(n)} (Pict(i, j, t) - Pict(i, j, t-1))^2$$

Where t represents the current frame and t−1 the previous frame, i and j represent the horizontal and vertical positions of each pixels:
defining the noise level as the smallest MSE(n) for all blocks Block(n), comparing the various MSE(n) to a value MOTION BLOCK,
if MSE(n)≧MOTION BLOCK, MOTION counter is increased, the MOTION-counter being initialised at the beginning of each frame and,
when MOTION counter≧MOTION-limit then MOTION=ON else MOTION=OFF.

19. A method according to claim 1, wherein, when no information about noise is available, the noise detection is done with a method comprising the following steps of:
  dividing the current frame (t) in small blocks Block(n)
  computing, for each corresponding block of a searching area in the previous frame (t−1) a mean square error:

$$MSE(\delta x, \delta y, n) = \frac{1}{N} \sum_{Block(n)} (Pict(i, j, t) - Pict(i - \delta x, j - \delta y, t-1))^2$$

Where N represents the size of the block n,
computing, for each position in the searching area $(\delta x, \delta y)$, the smallest MSE for a block n,
choosing, $MSE_{min}(n) = \min_{\delta x, \delta y} (MSE(\delta x, \delta y)$ for noise estimation,
choosing Motion(n)=1 if $MSE_{min}(n)$ is given for $(\delta x, \delta y)=(0,0)=0$
computing, using the various $MSE_{min}(n)$ an histogram of errors for the noise estimation,
computing a value $$\text{Motion-sum} = \sum_{all\ block\ n} Motion(n),$$

comparing this value to a limit and if Motion-sum≧Motion-limit then motion=ON else MOTION=OFF.

20. A system for implementing the method according to claim 1, wherein it comprises a front end IE delivering information about noise and motion, a dedicated plasma IC and a plasma panel.

21. A system for implementing the method according to claim 1, wherein it comprises a front end IC delivering no information about noise and motion, a dedicated plasma IC incorporating specific methods for detecting noise and motion, a microcontroller and a plasma panel.

22. A system according to claim 21, wherein it further comprises a frame memory to implement the method.

23. A system for implementing the method according to claim 12, wherein it comprises a front end IC delivering no information about noise and motion, a dedicated plasma IC incorporating specific methods for detecting noise and motion, a microcontroller and a plasma panel.

* * * * *